(12) United States Patent
Huang et al.

(10) Patent No.: US 11,010,397 B2
(45) Date of Patent: May 18, 2021

(54) METHOD AND SYSTEM FOR DISPLAYING APPLICATIONS (71) Applicant: SHENZHEN TCL DIGITAL TECHNOLOGY LTD., Shenzhen (CN)

(72) Inventors: Sunming Huang, Shenzhen (CN); Yunhua Wang, Shenzhen (CN)

(73) Assignee: SHENZHEN TCL DIGITAL TECHNOLOGY LTD., Shenzhen (CN)

(*) Notice: Subject to any disclaimer, the term of this patent is extended or adjusted under 35 U.S.C. 154(b) by 371 days.

(21) Appl. No.: 16/070,160

(22) PCT Filed: Jun. 3, 2016

(86) PCT No.: PCT/CN2016/084740
§ 371 (c)(1),
(2) Date: Jul. 13, 2018

(87) PCT Pub. No.: WO2017/121066
PCT Pub. Date: Jul. 20, 2017

(65) Prior Publication Data
US 2019/0018886 A1 Jan. 17, 2019

(30) Foreign Application Priority Data
Jan. 14, 2016 (CN) .......................... 201610025716.6

(51) Int. Cl.
G06F 16/30 (2019.01)
G06F 16/248 (2019.01)
(Continued)

(52) U.S. Cl.
CPC .......... *G06F 16/248* (2019.01); *G06F 3/0481* (2013.01); *G06F 9/451* (2018.02);
(Continued)

(58) Field of Classification Search
CPC ...... G06F 16/248; G06F 3/0481; G06F 9/451; G06F 16/24578; H04N 21/478;
(Continued)

(56) References Cited

U.S. PATENT DOCUMENTS

2011/0106954 A1  5/2011 Chatterjee et al.
2014/0068522 A1* 3/2014 Lim .................... G06F 3/04817
                                                    715/846
(Continued)

FOREIGN PATENT DOCUMENTS

CN  101242604 A   8/2008
CN  102750169    10/2012
(Continued)

OTHER PUBLICATIONS

Extended European Search Report from corresponding European Patent Application No. 16884625, dated Jun. 19, 2019, pp. 1-11, European Patent Office, Munich, Germany.
(Continued)

*Primary Examiner* — Tyler J Torgrimson
(74) *Attorney, Agent, or Firm* — Hauptman Ham, LLP (57) ABSTRACT A method for displaying applications which includes: obtaining the applications installed in a master device and the applications installed in a slave device when the master device is connected with the slave device; if the master device and the slave device have a same application, using the same application as the application to be recommended; obtaining the usage information of the application to be recommended, and determining the priority of the application to be recommended according to the usage information; and displaying the application to be recommended on the master device or the slave device according to a level of the priority. The present disclosure further discloses a system for displaying applications.

15 Claims, 6 Drawing Sheets (51) Int. Cl.

| | | |
|---|---|---|
| *G06F 3/0481* | (2013.01) | |
| *H04N 21/478* | (2011.01) | |
| *H04L 29/08* | (2006.01) | |
| *H04M 1/72412* | (2021.01) | |
| *G06F 9/451* | (2018.01) | |
| *G06F 16/2457* | (2019.01) | |
| *H04M 1/72415* | (2021.01) | |
| *H04M 1/72472* | (2021.01) | |
| *H04N 21/45* | (2011.01) | |
| *H04N 21/466* | (2011.01) | |
| *H04N 21/81* | (2011.01) | |

(52) U.S. Cl.
CPC ...... *G06F 16/24578* (2019.01); *H04L 67/025* (2013.01); *H04L 67/34* (2013.01); *H04M 1/72412* (2021.01); *H04N 21/478* (2013.01); *H04M 1/72415* (2021.01); *H04M 1/72472* (2021.01); *H04N 21/4532* (2013.01); *H04N 21/4668* (2013.01); *H04N 21/8173* (2013.01)

(58) Field of Classification Search
CPC .......... H04N 21/4532; H04N 21/4668; H04N 21/8173; H04M 1/7253; H04M 1/72533; H04M 1/72586; H04L 67/34; H04L 67/025
See application file for complete search history.

(56) References Cited

U.S. PATENT DOCUMENTS

| | | | | |
|---|---|---|---|---|
| 2014/0082117 A1* | 3/2014 | Unhale | ............... | H04L 63/0876 709/208 |
| 2014/0157387 A1 | 6/2014 | Lee et al. | | |
| 2014/0201675 A1 | 7/2014 | Joo et al. | | |
| 2015/0087289 A1* | 3/2015 | Ahn | ........................ | H04W 4/50 455/419 |
| 2015/0243246 A1 | 8/2015 | Mun et al. | | |
| 2015/0339112 A1* | 11/2015 | Ryu | ....................... | G06F 11/324 717/174 |
| 2016/0224211 A1* | 8/2016 | Xu | .................... | H04M 1/72472 |
| 2016/0371474 A1* | 12/2016 | Ahn | .................... | G06F 21/6218 |
| 2017/0272316 A1* | 9/2017 | Johnson | ............... | G06Q 10/103 |

FOREIGN PATENT DOCUMENTS

| | | |
|---|---|---|
| CN | 102868817 A | 1/2013 |
| CN | 103530220 A | 1/2014 |
| CN | 104298505 A | 1/2015 |
| CN | 104808983 | 7/2015 |
| CN | 105187928 | 12/2015 |
| CN | 105487763 | 4/2016 |
| EP | 2648427 A1 | 10/2013 |
| WO | 2015098162 A1 | 7/2015 |

OTHER PUBLICATIONS

International Search Report dated Aug. 31, 2016 from corresponding application No. PCT/CN2016/084740.

Chinese Office Action issued in corresponding Application No. 201610025716.6, dated Jun. 27, 2019, pp. 1-5, The State Intellectual Property Office of People's Republic of China, Beijing, China.

European Office Action issued in corresponding European Patent Application No. 16884625, dated Jun. 3, 2020, pp. 1-6, European Patent Office, Rijswijk, Netherlands.

* cited by examiner

METHOD AND SYSTEM FOR DISPLAYING APPLICATIONS

RELATED APPLICATIONS

The present application is a National Phase of International Application Number PCT/CN2016/084740, filed Jun. 3, 2016, and claims the priority of China Application No. 201610025716.6, filed Jan. 14, 2016.

FIELD

The present disclosure relates to the field of multimedia televisions, and more particularly to a method and system for displaying applications.

BACKGROUND

With the development of science and technology, televisions are applied with more and more functions. Meanwhile, the number of applications installed in the television is increasing. Due to different user hobbies, the applications installed in the television by different users are various, and different applications would be used at different use frequencies, some are frequently used, and some are used less frequently. Currently, the applications which are frequently used by users cannot be recognized according to the user's preference to display on the television screen, that is, the applications that user frequently uses cannot be recommended to the user. The applications are displayed on the television in the manner of based in the order of the applications installation. When the applications installed in the television reaches a certain number, it is difficult for the user to find a required application quickly on the screen through the remote controller. For example, some one of the users buys a smart television, the smart television has a total of 200 applications installed, of which, an application, such as a video application IQIYI® is the 99th displayed in the list of the applications, so the user has to manipulate the remote control several times to find iQiyi each time. As a result, the user cannot quickly find the applications which are frequently used in numerous applications.

SUMMARY

The present disclosure is to provide a method and system for displaying applications, which aims to solve the technical problems that an existing terminal device cannot display the applications according to a user's preference.

In order to achieve the above aim, the present disclosure provides a method for displaying applications, which includes:

obtaining the applications installed in a master device and the applications installed in a slave device when the master device is connected with the slave device;

obtaining package names of the applications in the slave device and package names of the applications in the master device, and determining whether the applications in the slave device and the applications in the master device have a same package name;

if the master device determines that the slave device and the master device have the same package name, using the application corresponding to the same package name in the slave device and the master device as the application to be recommended;

obtaining the usage information of the application to be recommended, and determining the priority of the application to be recommended according to the usage information; and displaying the application to be recommended on the master device or the slave device according to a level of the priority.

Furthermore, in order to achieve the above aim, the present disclosure provides a method for displaying applications, which includes:

obtaining the applications installed in a master device and the applications installed in a slave device when the master device is connected with the slave device;

if the master device and the slave device have a same application, using the same application as the application to be recommended;

obtaining the usage information of the application to be recommended, and determining the priority of the application to be recommended according to the usage information; and displaying the application to be recommended on the master device or the slave device according to a level of the priority.

Furthermore, in order to achieve the above aim, the present disclosure provides a system for displaying applications, which includes:

an obtaining module, configured for obtaining the applications installed in a master device and the applications installed in a slave device when the master device is connected with the slave device;

a processing module, configured for using a same application as the application to be recommended if the master device and the slave device have the same application;

a determining module, configured for obtaining the usage information of the application to be recommended, and determining the priority of the application to be recommended according to the usage information; and a first displaying module, configured for displaying the application to be recommended on the master device or the slave device according to a level of the priority.

In the present disclosure, when the master device and the slave device are connected, the application installed in the master device and the application installed in the slave device are obtained, and then use the same application in the slave device and the master device as the application to be recommended, determine the priority of the application to be recommended according to the usage information, and display the application to be recommended on the master device or the slave device according to a level of the priority. It realizes that a terminal device automatically displays the application on a screen according to the usage information of a user, allowing the application that the user likes to be found quickly in numerous applications, thereby the intelligence of the terminal device is improved.

Various implementations, functional features, and advantages of the present disclosure will now be described in further detail with reference to the accompanying drawings and some illustrative embodiments.

DETAILED DESCRIPTION OF THE EMBODIMENTS

It is to be understood that, the specific embodiments described herein portrays merely some illustrative embodiments of the present disclosure, and are not intended to limit the patentable scope of the present disclosure.

The present disclosure provides a method for displaying applications.

Figure 1:
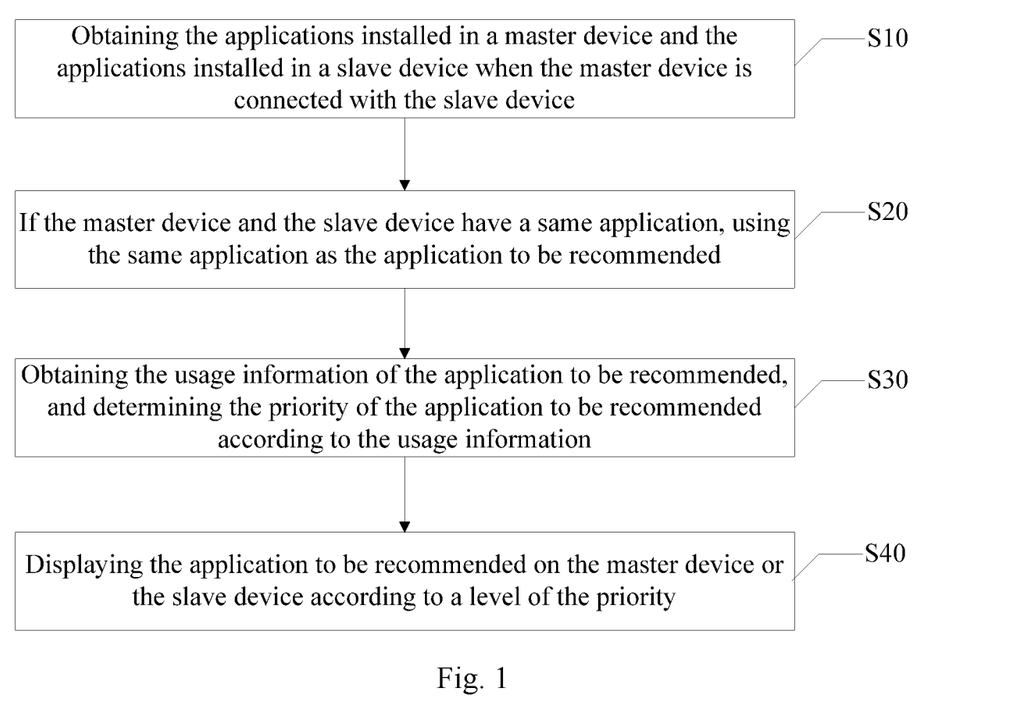
FIG. 1 is a flowchart illustrating a first embodiment of a method for displaying applications according to the present disclosure.

Referring to FIG. 1, FIG. 1 is a flowchart illustrating a first embodiment of a method for displaying applications according to the present disclosure.

In the embodiment, the method for displaying applications includes:

S10, obtaining the applications installed in a master device and the applications installed in a slave device when the master device is connected with the slave device;

When the master device and the slave device are connected via WiFi (Wireless-Fidelity) or Bluetooth, the application installed in the master device and the application installed in the slave device are obtained. In this embodiment, the master device is a smart television, but the master device includes but is not limited to the smart television, and may also be a personal computer or the like. The slave device is a mobile phone, a pad (portable android device, tablet personal computer), or the like. Further, when the master device obtains the applications installed in the slave device and the applications installed in the master device, the master device obtains package names of the applications in the slave device and package names of the applications in the master device, and determines whether the applications in the slave device and the applications in the master device have a same package name. The specific process of determining, by the master device, whether the same package name exists in the slave device applications and the master device applications is: the master device converts the package name of the slave device application into an ASCII character (American standard code for information), at the same time the package name of the main device application is converted to an ASCII character. The master device calculates a difference between the ASCII character corresponding to the package name of the applications in the master device and the ASCII character corresponding to the package name of the applications in the slave device, and determines whether the master device and the slave device have a same package name according to the difference.

The number of the slave device is one or more. In this embodiment, there are two slave devices, one is a mobile phone, and the other is a pad. After the smart television is connected with the mobile phone and the pad via WiFi, the smart television obtains the applications installed therein, and obtains the applications installed in the mobile phone, and the applications installed in the pad. Further, when the applications, such as video applications YOUKU®, IQIYI® and TENCENT VIDEO® are installed in the smart television, the smart television obtains the package names of YOUKU®, IQIYI® and TENCENT VIDEO®, and the package names of YOUKU®, IQIYI® and TENCENT VIDEO® in the smart television are stored in a storage area 33, and the package names of YOUKU®, IQIYI® and TENCENT VIDEO® are converted to ASCII characters. When the smart television obtains that YOUKU® and TENCENT VIDEO® are installed in the pad, the smart television obtains the package names of YOUKU® and TENCENT VIDEO® in the pad, and stores the package names of YOUKU® and TENCENT VIDEO® in a storage area 22, and the package names of YOUKU® and TENCENT VIDEO® in the pad are converted into ASCII characters. When the smart television obtains that IQIYI® and TENCENT VIDEO® are installed in the pad, the smart television obtains the package names of IQIYI® and TENCENT VIDEO® in the mobile phone, and stores the package names of IQIYI® and TENCENT VIDEO® in a storage area 11, and the package names of IQIYI® and TENCENT VIDEO® in the mobile phone are converted into ASCII characters. The smart television compares the storage area 33 with the storage area 22 and the storage area 11 respectively, and determines whether the smart television and the mobile phone and the pad have the same package name by the difference.

S20, if the master device and the slave device have a same application, using the same application as the application to be recommended;

When the master device respectively obtains the applications installed in the master device and in the slave device, the master device determines whether the same application exists in the slave device and the master device. If the master device and the slave device have the same application, the master device uses the same application as the application to be recommended. Further, when the master device determines that the same package name exists in the slave device and the master device, that is, when the difference between the ASCII characters corresponding to the package name of the application in the master device and the package name of the application in the slave device is 0, the master device uses the application corresponding to the same package name in the slave device and the master device as the application to be recommended.

When the smart television obtains the applications installed therein and obtains the applications installed in the mobile phone and the applications installed in the pad, the smart television determines whether there exists the same application of the applications in the smart television, the mobile phone and the pad. If the smart television, the mobile phone and the pad have the same application, the smart television would use the application which simultaneously exists in the smart television, the mobile phone and the pad as the application to be recommended. Further, when the smart television calculates the difference between the storage area 33 and the storage area 22, the difference result and the package name corresponding to the difference value of 0 are stored in the storage area 44. When there is a value of 0 in the storage area 44, it means that the same application exists in the smart television and the pad. When the smart television calculates the difference between the storage area 33 and the storage area 11, the difference result and the package name corresponding to the difference value of 0 are stored in the storage area 55. When there is a value of 0 in the storage area 55, it means that the same application exists in the smart television and the mobile phone. The smart television can determine the application installed in the smart television, the pad, and the mobile phone by using a similar method, that is, determine whether there is the application installed in the smart television, the pad, and the mobile phone simultaneously. The specific determining process would not be described here. The smart television can compare the storage area 44 with the storage area 55 to obtain the application installed in the smart television, the pad, and the mobile phone simultaneously, and the package name corresponding to the application simultaneously installed in the smart television, the pad, and the mobile phone is stored in the storage area 66. The priority of the application installed in the smart television, the pad, and the mobile phone simultaneously is higher than the priority of the application installed in the smart television and the pad simultaneously, and also higher than the priority of the application installed in the smart television and the mobile phone simultaneously.

S30, obtaining the usage information of the application to be recommended, and determining the priority of the application to be recommended according to the usage information; and S40, displaying the application to be recommended on the master device or the slave device according to a level of the priority.

The master device obtains the usage information of the application to be recommended, and determines the priority of the application to be recommended according to the usage information. The master device displays the application to be recommended on its screen according to the priority level, that is, the master device displays the application to be recommended with high priority at the front position on the screen, and displays the application to be recommended with low priority behind the application to be recommended with high priority. The master device sends the priority information of the application to be recommended to the slave device, when the slave device receives the priority information of the application to be recommended, the slave device displays the application to be recommended on its screen according to the priority of the application to be recommended, that is, the slave device displays the application to be recommended with high priority at the front position on the screen, and displays the application to be recommended with low priority behind the application to be recommended with high priority. The usage information includes, but is not limited to, the number of startups of the application to be recommended in the preset time, the running time, and/or the time of receiving the operation instruction during runtime. For example, when the master device determines the greater of the number of startups of the application to be recommended in the preset time, the longer of the running time and/or the longer of the time of receiving the operation instruction during runtime, the higher priority of the application to be recommended. The preset time is set according to a specific situation, for example, it can be set as 24 hours, 48 hours, and the like.

If the slave device and the master device do not have the same application, the master device determines the application to be recommended according to the usage information of the application installed in the slave device and in the master device. Such as the smart television determines the application to be recommended according to the frequency of use of the application installed in the smart television, the pad, and the mobile phone.

For example, when the applications to be recommended are an video application IQIYI®, a messaging application WECHAT® and a news application TENCENT NEWS®, the smart television obtains the usage information of IQIYI®, WECHAT® and TENCENT NEWS®. When the smart television determines that WECHAT® has a higher priority than TENCENT NEWS® according to the usage information of IQIYI®, WECHAT® and TENCENT NEWS®, and TENCENT NEWS® has a higher priority than IQIYI®, then the smart television displays WECHAT® at the foremost position in the display area on its screen, displays TENCENT NEWS® behind WECHAT®, and displays IQIYI® behind TENCENT NEWS®.

In this embodiment, when the master device and the slave device are connected, the application installed in the master device and the application installed in the slave device are obtained, and then use the same application in the slave device and the master device as the application to be recommended, determine the priority of the application to be recommended according to the usage information, and display the application to be recommended on the master device or the slave device according to a level of the priority. It realizes that a terminal device automatically displays the application on a screen according to the usage information of a user, allowing the application that the user likes to be found quickly in numerous applications, thereby the intelligence of the terminal device is improved.

Figure 2:
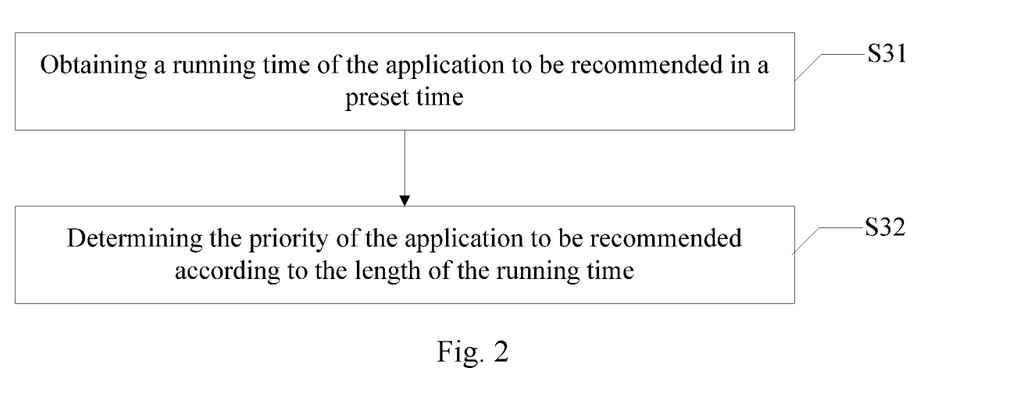
FIG. 2 is a first flowchart illustrating an embodiment of obtaining the usage information of the application to be recommended, and determining the priority of the application to be recommended according to the usage information according to the present disclosure.

Referring to FIG. 2, FIG. 2 is a first flowchart illustrating an embodiment of obtaining the usage information of the application to be recommended, and determining the priority of the application to be recommended according to the usage information according to the present disclosure.

In this embodiment, S30 includes:

S31, obtaining a running time of the application to be recommended in a preset time; and S32, determining the priority of the application to be recommended according to the length of the running time.

The master device obtains the running time of the application to be recommended in the preset time, and determines the priority of the application to be recommended according to the running time of the application to be recommended in the preset time. The preset time is set according to a specific situation, and may be set as 24 hours, 48 hours, or the like. In this embodiment, the preset time is 24 hours. For example, when the applications to be recommended are IQIYI®, WECHAT® and TENCENT NEWS®, the smart television obtains the running time of IQIYI® is 4 hours in 24 hours, and the running time of WECHAT® is 5 hours in 24 hours, and the running time of TENCENT NEWS® is 2 hours in 24 hours. The smart television determines, according to the running time of IQIYI®, WECHAT® and TENCENT NEWS® within 24 hours, that the priority of WECHAT® is higher than the priority of IQIYI®, the priority of IQIYI® is higher than the priority of TENCENT NEWS®.

Further, in the preset time, if the duration from startup to exit of the application to be recommended exceeds a first preset duration, then the duration from startup to exit is counted in the running time of the application to be recommended in a preset time.

Further, in the preset time, the master device determines whether the duration from startup to exit of the application to be recommended exceeds the first preset duration. If the duration from startup to exit of the application to be recommended exceeds the first preset duration, the master device counts the duration from startup to exit in the running time of the application to be recommended in the preset time; if the duration from startup to exit of the application to be recommended does not exceed the first preset duration, the master device does not count the duration from startup to exit in the running time of the application to be recommended in the preset time. The first preset duration is set according to a specific situation, for example, may be set as 15 minutes, 20 minutes, and the like. In this embodiment, the first preset duration is 15 minutes. If the smart television determines that IQIYI® has a duration of 10 minutes from startup to exit within 24 hours, the smart television does not count the 10 minutes of IQIYI® in the running time of IQIYI® in the 24 hours; when IQIYI® has a duration of 30 minutes from startup to exit, the smart television counts the 30 minutes of IQIYI® in the running time of IQIYI® in the 24 hours.

In this embodiment, the priority of the application to be recommended is determined according to the length of the running time of the application to be recommended in the preset time, so that the application to be recommended is displayed according to the priority of the application to be recommended, which improves the intelligence of the terminal device.

Figure 3:
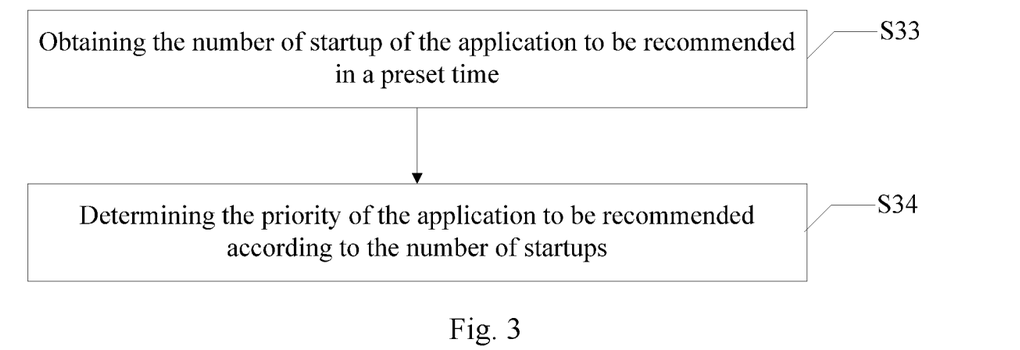
FIG. 3 is a second flowchart illustrating an embodiment of obtaining the usage information of the application to be recommended, and determining the priority of the application to be recommended according to the usage information according to the present disclosure.

Referring to FIG. 3, FIG. 3 is a second flowchart illustrating an embodiment of obtaining the usage information of the application to be recommended, and determining the priority of the application to be recommended according to the usage information according to the present disclosure.

In this embodiment, S30 includes:

S33, obtaining the number of startup of the application to be recommended in a preset time; and S34, determining the priority of the application to be recommended according to the number of startup.

The master device obtains the number of startup of the application to be recommended in the preset time, and determines the priority of the application to be recommended according to the number of startup of the application to be recommended in the preset time. The preset time may be set as 24 hours, 30 hours, or the like. In this embodiment, the preset time is 24 hours. For example, when the applications to be recommended are IQIYI®, WECHAT® and TENCENT NEWS®, the smart television obtains the number of startup of IQIYI® is 7 times in 24 hours, and the number of startup of WECHAT® is 10 times in 24 hours, and the number of startup of TENCENT NEWS® is 5 times in 24 hours. The smart television determines, according to the number of startup of IQIYI®, WECHAT® and TENCENT NEWS® within 24 hours, that the priority of WECHAT® is higher than the priority of IQIYI®, the priority of IQIYI® is higher than the priority of TENCENT NEWS®.

Further, in the preset time, if the duration from startup to exit of the application to be recommended exceeds a second preset duration, then counts the startup of application to be recommended as once.

Further, in the preset time, the master device determines whether the duration from startup to exit of the application to be recommended exceeds the second preset duration. If the duration from startup to exit of the application to be recommended exceeds the second preset duration, the master device counts the startup of application to be recommended in the number of startup of the application to be recommended, that is, the master device counts the startup of application to be recommended as once; if the duration from startup to exit of the application to be recommended does not exceed the second preset duration, the master device does not count the startup of application to be recommended in the number of startup of the application to be recommended. The second preset duration may be the same or different with the first preset duration, for example, may be set as 10 minutes, 15 minutes, and the like. In this embodiment, the second preset duration is 15 minutes. If the smart television determines that IQIYI® has a duration of 10 minutes from startup to exit within 24 hours, the smart television does not count this startup in the number of startup of IQIYI®; when IQIYI® has a duration of 30 minutes from startup to exit, the smart television counts this startup in the number of startup of IQIYI®.

In this embodiment, the priority of the application to be recommended is determined according to the number of startup of the application to be recommended in the preset time, so that the application to be recommended is displayed according to the priority of the application to be recommended, which improves the intelligence of the terminal device.

Figure 4:
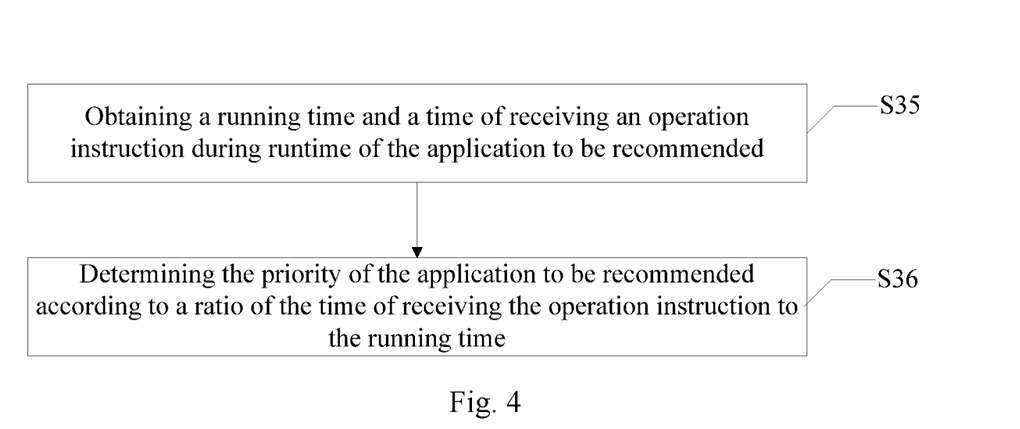
FIG. 4 is a third flowchart illustrating an embodiment of obtaining the usage information of the application to be recommended, and determining the priority of the application to be recommended according to the usage information according to the present disclosure.

Referring to FIG. 4, FIG. 4 is a third flowchart illustrating an embodiment of obtaining the usage information of the application to be recommended, and determining the priority of the application to be recommended according to the usage information according to the present disclosure.

In this embodiment, S30 includes:

S35, obtaining a running time and a time of receiving an operation instruction during runtime of the application to be recommended; and S36, determining the priority of the application to be recommended according to a ratio of the time of receiving the operation instruction to the running time.

The master device obtains the running time in a period and the time of receiving an operation instruction during runtime of the application to be recommended. According to the running time in a period and the time of receiving an operation instruction during runtime, the master device calculates the ratio of the time of receiving the operation instruction to the running time, determines the priority of the application to be recommended according to the ratio. The time of receiving the operation instruction is an operation performed by the user to the application to be recommended during the processing of the application to be recommended, such as a selecting operation of selecting a certain video for playback during the processing of Tencent Video, performing operations such as volume adjustment and the like to the video being played.

For example, when the smart television obtains that the applications to be recommended are IQIYI®, YOUKU® and TENCENT VIDEO®, the smart television obtains the running time of TENCENT VIDEO® is 5 hours in 24 hours, during the 5 hours of the operation of TENCENT VIDEO®, the time of receiving the operation instruction from the user is 40 minutes, its proportion in the running time of TENCENT VIDEO® is 13%; the smart television obtains the running time of YOUKU® is 2 hours in 24 hours, during the 2 hours of the operation of YOUKU®, the time of receiving the operation instruction from the user is 15 minutes, its proportion in the running time of YOUKU® is 12.5%; the smart television obtains the running time of IQIYI® is 3 hours in 24 hours, during the 3 hours of the operation of IQIYI®, the time of receiving the operation instruction from the user is 9 minutes, its proportion in the running time of IQIYI® is 5%. Then the smart television determines that the priority of TENCENT VIDEO® is higher than the priority of YOUKU®, and the priority of YOUKU® is higher than the priority of IQIYI®.

In this embodiment, the priority of the application to be recommended is determined according to the running time and the time of receiving an operation instruction during runtime of the application to be recommended, so that the application to be recommended is displayed according to the priority of the application to be recommended, which improves the intelligence of the terminal device.

Figure 5:
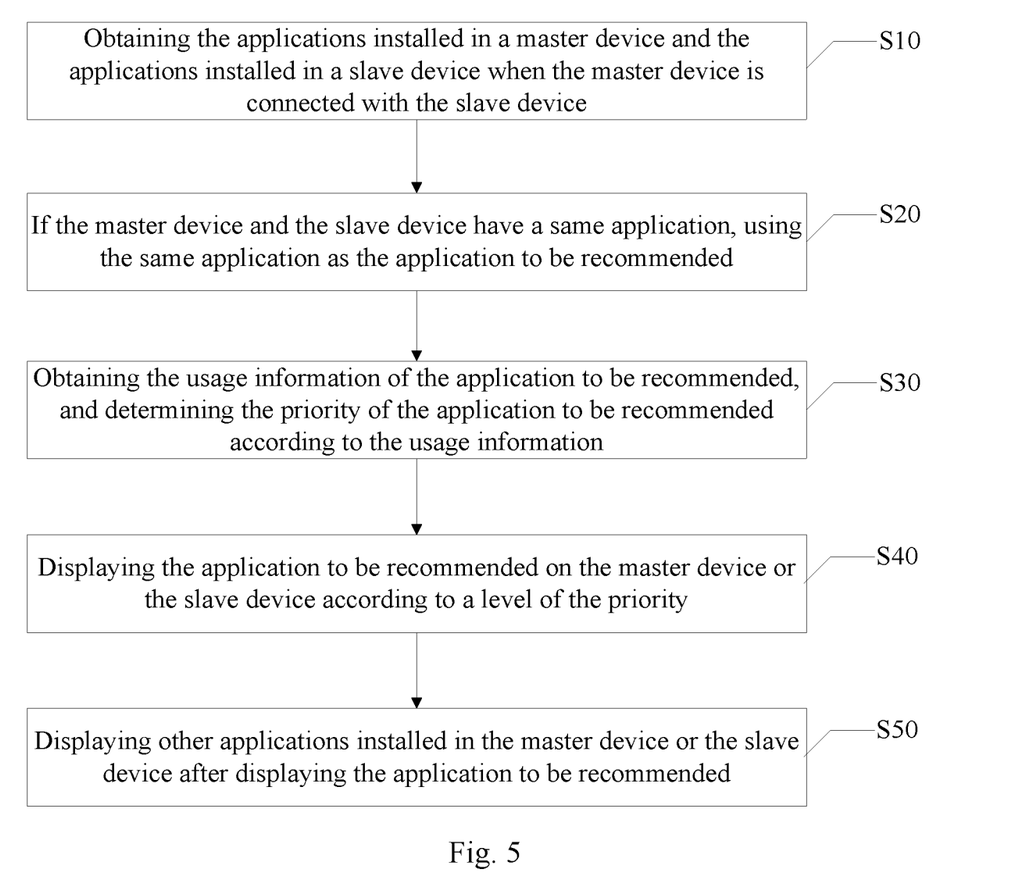
FIG. 5 is a flowchart illustrating a second embodiment of a method for displaying applications according to the present disclosure.

Referring to FIG. 5, FIG. 5 is a flowchart illustrating a second embodiment of a method for displaying applications according to the present disclosure. The second embodiment of the method for displaying the application is based on the first embodiment.

In this embodiment, the method for displaying the application further includes:

S50, displaying other applications installed in the master device or the slave device after displaying the application to be recommended.

After displaying the application to be recommended, other applications installed in the master device or the slave device are displayed on the screen, and the application to be recommended is displayed in the front of other applications.

Further, S50 includes:

obtaining the usage information of the other applications, determining the priority of the other applications according to the usage information which includes a running time, the number of startup, or a time of receiving an operation instruction during runtime in a preset time; and displaying the other applications according to the levels of the priority after displaying the application to be recommended.

The master device obtains the usage information of the other applications, and determines the priority of the other applications according to the usage information. The usage information includes, but is not limited to, a running time, the number of startup, or a time of receiving an operation instruction during runtime of the other applications in a preset time. The preset time is set according to a specific situation, and may be set as 24 hours, 48 hours, or the like. When the master device obtains the priority of the other applications, the other applications are displayed according to the priority of the other applications.

This embodiment displays other applications in the master device and/or the slave device after displaying the application to be recommended. The application that is of interest to the user is displayed on the screen according to the degree of interest, which improves the intelligence of the terminal device.

The present disclosure further provides a system for displaying applications.

Figure 6:
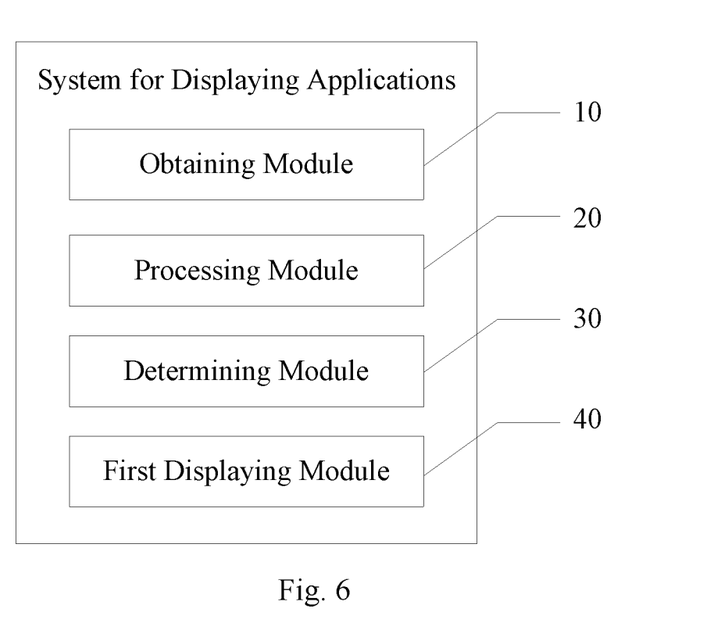
FIG. 6 is a block diagram illustrating a first embodiment of a system for displaying applications according to the present disclosure.

Referring to FIG. 6, FIG. 6 is a block diagram illustrating a first embodiment of a system for displaying applications according to the present disclosure.

In the embodiment, the system for displaying applications includes:

An obtaining module 10, configured for obtaining the applications installed in a master device and the applications installed in a slave device when the master device is connected with the slave device;

When the master device and the slave device are connected via WiFi (Wireless-Fidelity) or Bluetooth, the applications installed in the master device and the applications installed in the slave device are obtained. In this embodiment, the master device is a smart television, but the master device includes but is not limited to the smart television, and may also be a personal computer or the like. The slave device is a mobile phone, a pad (portable android device, tablet personal computer), or the like. Further, when the master device obtains the applications installed in the slave device and the applications installed in the master device, the master device obtains package names of the applications in the slave device and package names of the applications in the master device, and determines whether the applications in the slave device and the applications in the master device have a same package name. The specific process of determining, by the master device, whether the same package name exists in the slave device applications and the master device applications is: the master device converts the package name of the slave device application into an ASCII character (American standard code for information), at the same time the package name of the main device application is converted to an ASCII character. The master device calculates a difference between the ASCII character corresponding to the package name of the applications in the master device and the ASCII character corresponding to the package name of the applications in the slave device, and determines whether the master device and the slave device have a same package name according to the difference.

The number of the slave device is one or more. In this embodiment, there are two slave devices, one is a mobile phone, and the other is a pad. After the smart television is connected with the mobile phone and the pad via WiFi, the smart television obtains the applications installed therein, and obtains the applications installed in the mobile phone, and the applications installed in the pad. Further, when the applications YOUKU®, IQIYI® and TENCENT VIDEO® are installed in the smart television, the smart television obtains the package names of YOUKU®, IQIYI® and TENCENT VIDEO®, and the package names of YOUKU®, IQIYI® and TENCENT VIDEO® in the smart television are stored in a storage area 33, and the package names of YOUKU®, IQIYI® and TENCENT VIDEO® are converted to ASCII characters. When the smart television obtains that YOUKU® and TENCENT VIDEO® are installed in the pad, the smart television obtains the package names of YOUKU® and TENCENT VIDEO® in the pad, and stores the package names of YOUKU® and TENCENT VIDEO® in a storage area 22, and the package names of YOUKU® and TENCENT VIDEO® in the pad are converted into ASCII characters. When the smart television obtains that IQIYI® and TENCENT VIDEO® are installed in the pad, the smart television obtains the package names of IQIYI® and TENCENT VIDEO® in the mobile phone, and stores the package names of IQIYI® and TENCENT VIDEO® in a storage area 11, and the package names of IQIYI® and TENCENT VIDEO® in the mobile phone are converted into ASCII characters. The smart television compares the storage area 33 with the storage area 22 and the storage area 11 respectively, and determines whether the smart television and the mobile phone and the pad have the same package name by the difference.

A processing module 20, configured for using a same application as the application to be recommended if the master device and the slave device have the same application;

When the master device respectively obtains the applications installed in the master device and in the slave device, the master device determines whether the same application exists in the slave device and the master device. If the master device and the slave device have the same application, the master device uses the same application as the application to be recommended. Further, when the master device determines that the same package name exists in the slave device and the master device, that is, when the difference between the ASCII characters corresponding to the package name of the application in the master device and the package name of the application in the slave device is 0, the master device uses the application corresponding to the same package name in the slave device and the master device as the application to be recommended.

When the smart television obtains the applications installed therein and obtains the applications installed in the mobile phone and the applications installed in the pad, the smart television determines whether there exists the same application of the applications in the smart television, the mobile phone and the pad. If the smart television, the mobile phone and the pad have the same application, the smart television would use the application which simultaneously exists in the smart television, the mobile phone and the pad as the application to be recommended. Further, when the smart television calculates the difference between the storage area 33 and the storage area 22, the difference result and the package name corresponding to the difference value of 0 are stored in the storage area 44. When there is a value of 0 in the storage area 44, it means that the same application exists in the smart television and the pad. When the smart television calculates the difference between the storage area 33 and the storage area 11, the difference result and the package name corresponding to the difference value of 0 are stored in the storage area 55. When there is a value of 0 in the storage area 55, it means that the same application exists in the smart television and the mobile phone. The smart television can determine the application installed in the smart television, the pad, and the mobile phone by using a similar method, that is, determine whether there is the application installed in the smart television, the pad, and the mobile phone simultaneously. The specific determining process would not be described here. The smart television can compare the storage area 44 with the storage area 55 to obtain the application installed in the smart television, the pad, and the mobile phone simultaneously, and the package name corresponding to the application simultaneously installed in the smart television, the pad, and the mobile phone is stored in the storage area 66. The priority of the application installed in the smart television, the pad, and the mobile phone simultaneously is higher than the priority of the application installed in the smart television and the pad simultaneously, and also higher than the priority of the application installed in the smart television and the mobile phone simultaneously.

A determining module 30, configured for obtaining the usage information of the application to be recommended, and determining the priority of the application to be recommended according to the usage information; and A first displaying module 40, configured for displaying the application to be recommended on the master device or the slave device according to a level of the priority.

The master device obtains the usage information of the application to be recommended, and determines the priority of the application to be recommended according to the usage information. The master device displays the application to be recommended on its screen according to the priority level, that is, the master device displays the application to be recommended with high priority at the front position on the screen, and displays the application to be recommended with low priority behind the application to be recommended with high priority. The master device sends the priority information of the application to be recommended to the slave device, when the slave device receives the priority information of the application to be recommended, the slave device displays the application to be recommended on its screen according to the priority of the application to be recommended, that is, the slave device displays the application to be recommended with high priority at the front position on the screen, and displays the application to be recommended with low priority behind the application to be recommended with high priority. The usage information includes, but is not limited to, the number of startups of the application to be recommended in the preset time, the running time, and/or the time of receiving the operation instruction during runtime. For example, when the master device determines the greater of the number of startups of the application to be recommended in the preset time, the longer of the running time and/or the longer of the time of receiving the operation instruction during runtime, the higher priority of the application to be recommended. The preset time is set according to a specific situation, for example, it can be set as 24 hours, 48 hours, and the like.

If the slave device and the master device do not have the same application, the master device determines the application to be recommended according to the usage information of the application installed in the slave device and in the master device. Such as the smart television determines the application to be recommended according to the frequency of use of the application installed in the smart television, the pad, and the mobile phone.

For example, when the applications to be recommended are IQIYI®, WECHAT® and TENCENT NEWS®, the smart television obtains the usage information of IQIYI®, WECHAT® and TENCENT NEWS®. When the smart television determines that WECHAT® has a higher priority than Tencent News according to the usage information of IQIYI®, WECHAT® and TENCENT NEWS®, and TENCENT NEWS® has a higher priority than IQIYI®, then the smart television displays WECHAT® at the foremost position in the display area on its screen, displays TENCENT NEWS® behind WECHAT®, and displays IQIYI® behind TENCENT NEWS®.

In this embodiment, when the master device and the slave device are connected, the application installed in the master device and the application installed in the slave device are obtained, and then use the same application in the slave device and the master device as the application to be recommended, determine the priority of the application to be recommended according to the usage information, and display the application to be recommended on the master device or the slave device according to a level of the priority. It realizes that a terminal device automatically displays the application on a screen according to the usage information of a user, allowing the application that the user likes to be found quickly in numerous applications, thereby the intelligence of the terminal device is improved.

Figure 7:
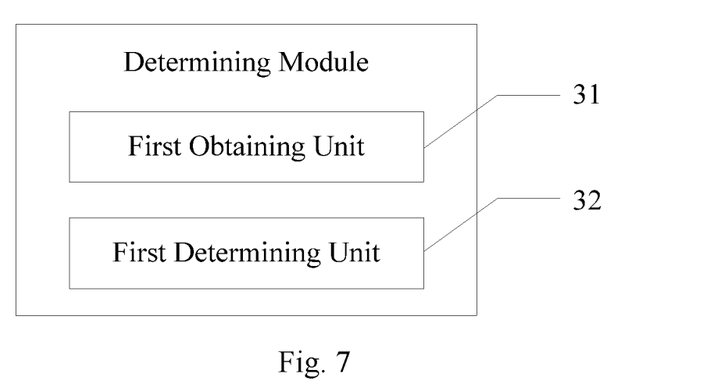
FIG. 7 is a first block diagram illustrating an embodiment of a determining module according to the present disclosure.

Referring to FIG. 7, FIG. 7 is a first block diagram illustrating an embodiment of a determining module according to the present disclosure.

In this embodiment, the determining module 30 includes:

A first obtaining unit 31, configured for obtaining a running time of the application to be recommended in a preset time; and A first determining unit 32, configured for determining the priority of the application to be recommended according to the length of the running time.

The master device obtains the running time of the application to be recommended in the preset time, and determines the priority of the application to be recommended according to the running time of the application to be recommended in the preset time. The preset time is set according to a specific situation, and may be set as 24 hours, 48 hours, or the like. In this embodiment, the preset time is 24 hours. For example, when the applications to be recommended are IQIYI®, WECHAT® and TENCENT NEWS®, the smart television obtains the running time of IQIYI® is 4 hours in 24 hours, and the running time of WECHAT® is 5 hours in 24 hours, and the running time of TENCENT NEWS® is 2 hours in 24 hours. The smart television determines, according to the running time of IQIYI®, WECHAT® and TENCENT NEWS® within 24 hours, that the priority of WECHAT® is higher than the priority of IQIYI the priority of IQIYI® is higher than the priority of TENCENT NEWS®.

Further, the determining module 30 includes:

A first processing unit, configured for counting the duration from startup to exit in the running time of the application to be recommended in a preset time, if the duration from startup to exit of the application to be recommended exceeds a first preset duration.

Further, in the preset time, the master device determines whether the duration from startup to exit of the application to be recommended exceeds the first preset duration. If the duration from startup to exit of the application to be recommended exceeds the first preset duration, the master device counts the duration from startup to exit in the running time of the application to be recommended in the preset time; if the duration from startup to exit of the application to be recommended does not exceed the first preset duration, the master device does not count the duration from startup to exit in the running time of the application to be recommended in the preset time. The first preset duration is set according to a specific situation, for example, may be set as 15 minutes, 20 minutes, and the like. In this embodiment, the first preset duration is 15 minutes. If the smart television determines that IQIYI® has a duration of 10 minutes from startup to exit within 24 hours, the smart television does not count the 10 minutes of IQIYI® in the running time of IQIYI® in the 24 hours; when IQIYI® has a duration of 30 minutes from startup to exit, the smart television counts the 30 minutes of IQIYI® in the running time of IQIYI® in the 24 hours.

In this embodiment, the priority of the application to be recommended is determined according to the length of the running time of the application to be recommended in the preset time, so that the application to be recommended is displayed according to the priority of the application to be recommended, which improves the intelligence of the terminal device.

Figure 8:
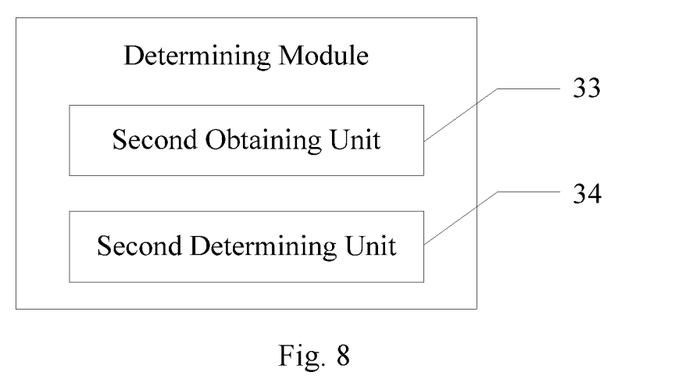
FIG. 8 is a second block diagram illustrating an embodiment of a determining module according to the present disclosure.

Referring to FIG. 8, FIG. 8 is a second block diagram illustrating an embodiment of a determining module according to the present disclosure.

In this embodiment, the determining module 30 further includes:

A second obtaining unit 33, configured for obtaining the number of startup of the application to be recommended in a preset time; and A second determining unit 34, configured for determining the priority of the application to be recommended according to the number of startup.

The master device obtains the number of startup of the application to be recommended in the preset time, and determines the priority of the application to be recommended according to the number of startup of the application to be recommended in the preset time. The preset time may be set as 24 hours, 30 hours, or the like. In this embodiment, the preset time is 24 hours. For example, when the applications to be recommended are IQIYI®, WECHAT® and TENCENT NEWS®, the smart television obtains the number of startup of IQIYI® is 7 times in 24 hours, and the number of startup of WECHAT® is 10 times in 24 hours, and the number of startup of TENCENT NEWS® is 5 times in 24 hours. The smart television determines, according to the number of startup of IQIYI®, WECHAT® and TENCENT NEWS® within 24 hours, that the priority of WECHAT® is higher than the priority of IQIYI®, the priority of IQIYI® is higher than the priority of TENCENT NEWS®.

Further, the determining module 30 comprises:

A second processing unit, configured for counting the startup of application to be recommended as once, if the duration from startup to exit of the application to be recommended exceeds a second preset duration in the preset time.

Further, in the preset time, the master device determines whether the duration from startup to exit of the application to be recommended exceeds the second preset duration. If the duration from startup to exit of the application to be recommended exceeds the second preset duration, the master device counts the startup of application to be recommended in the number of startup of the application to be recommended, that is, the master device counts the startup of application to be recommended as once; if the duration from startup to exit of the application to be recommended does not exceed the second preset duration, the master device does not count the startup of application to be recommended in the number of startup of the application to be recommended. The second preset duration may be the same or different with the first preset duration, for example, may be set as 10 minutes, 15 minutes, and the like. In this embodiment, the second preset duration is 15 minutes. If the smart television determines that IQIYI® has a duration of 10 minutes from startup to exit within 24 hours, the smart television does not count this startup in the number of startup of IQIYI®; when IQIYI® has a duration of 30 minutes from startup to exit, the smart television counts this startup in the number of startup of IQIYI®.

In this embodiment, the priority of the application to be recommended is determined according to the number of startup of the application to be recommended in the preset time, so that the application to be recommended is displayed according to the priority of the application to be recommended, which improves the intelligence of the terminal device.

Figure 9:
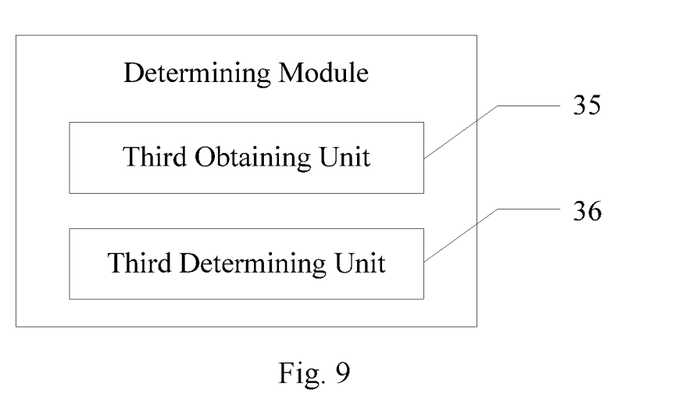
FIG. 9 is a third block diagram illustrating an embodiment of a determining module according to the present disclosure.

Referring to FIG. 9, FIG. 9 is a third block diagram illustrating an embodiment of a determining module according to the present disclosure.

In this embodiment, the determining module 30 includes:

A third obtaining unit 35, configured for obtaining a running time and a time of receiving an operation instruction during runtime of the application to be recommended; and A third determining unit 36, configured for determining the priority of the application to be recommended according to a ratio of the time of receiving the operation instruction to the running time.

The master device obtains the running time in a period and the time of receiving an operation instruction during runtime of the application to be recommended. According to the running time in a period and the time of receiving an operation instruction during runtime, the master device calculates the ratio of the time of receiving the operation instruction to the running time, determines the priority of the application to be recommended according to the ratio. The time of receiving the operation instruction is an operation performed by the user to the application to be recommended during the processing of the application to be recommended, such as a selecting operation of selecting a certain video for playback during the processing of Tencent Video, performing operations such as volume adjustment and the like to the video being played.

For example, when the smart television obtains that the applications to be recommended are IQIYI®, YOUKU® and TENCENT VIDEO®, the smart television obtains the running time of TENCENT VIDEO® is 5 hours in 24 hours, during the 5 hours of the operation of TENCENT VIDEO®, the time of receiving the operation instruction from the user is 40 minutes, its proportion in the running time of TENCENT VIDEO® is 13%; the smart television obtains the running time of YOUKU® is 2 hours in 24 hours, during the 2 hours of the operation of YOUKU®, the time of receiving the operation instruction from the user is 15 minutes, its proportion in the running time of YOUKU® is 12.5%; the smart television obtains the running time of IQIYI® is 3 hours in 24 hours, during the 3 hours of the operation of IQIYI®, the time of receiving the operation instruction from the user is 9 minutes, its proportion in the running time of IQIYI® is 5%. Then the smart television determines that the priority of TENCENT VIDEO® is higher than the priority of YOUKU®, and the priority of YOUKU® is higher than the priority of IQIYI®.

In this embodiment, the priority of the application to be recommended is determined according to the running time and the time of receiving an operation instruction during runtime of the application to be recommended, so that the application to be recommended is displayed according to the priority of the application to be recommended, which improves the intelligence of the terminal device.

Figure 10:
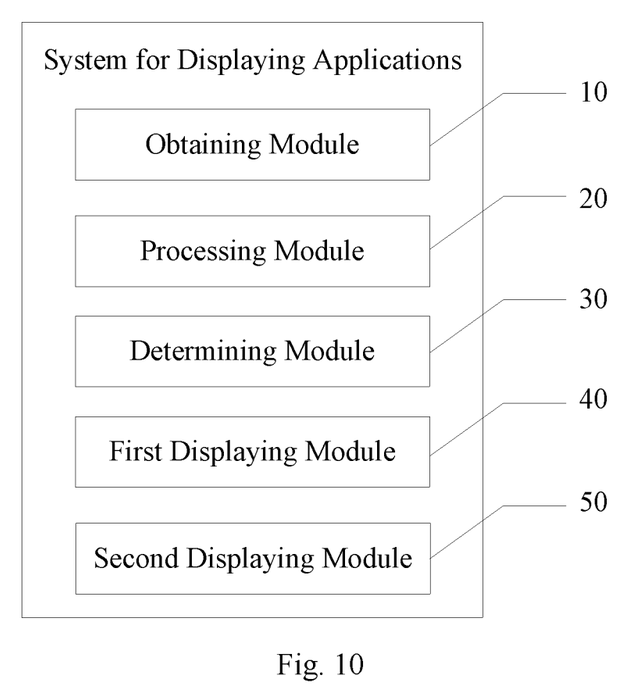
FIG. 10 is a block diagram illustrating a second embodiment of a system for displaying applications according to the present disclosure.

Referring to FIG. 10, FIG. 10 is a block diagram illustrating a second embodiment of a system for displaying applications according to the present disclosure. The second embodiment of the system for displaying the application is based on the first embodiment.

In this embodiment, the system for displaying the application further includes:

A second displaying module 50, configured for displaying other applications installed in the master device or the slave device after displaying the application to be recommended.

After displaying the application to be recommended, other applications installed in the master device or the slave device are displayed on the screen, and the application to be recommended is displayed in the front of other applications.

Further, the second displaying module 50 includes:

A fourth obtaining unit, configured for obtaining usage information of the other applications, determining the priority of the other applications according to the usage information which includes a running time, the number of startups, or a time of receiving an operation instruction during runtime in a preset time; and A displaying unit, configured for displaying the other applications according to the levels of the priority after displaying the application to be recommended.

The master device obtains the usage information of the other applications, and determines the priority of the other applications according to the usage information. The usage information includes, but is not limited to, a running time, the number of startups, or a time of receiving an operation instruction during runtime of the other applications in a preset time. The preset time is set according to a specific situation, and may be set as 24 hours, 48 hours, or the like. When the master device obtains the priority of the other applications, the other applications are displayed according to the priority of the other applications.

This embodiment displays other applications in the master device and/or the slave device after displaying the application to be recommended. The application that is of interest to the user is displayed on the screen according to the degree of interest, which improves the intelligence of the terminal device.

The foregoing description portrays merely some illustrative embodiments of the present disclosure, and are not intended to limit the patentable scope of the present disclosure. Any equivalent structural or flow transformations based on the specification and the drawing of the present disclosure, or any direct or indirect applications of the present disclosure in other related technical fields, shall all fall within the protection scope of the present disclosure.

What is claimed is:

1. A method for displaying applications, comprising:

obtaining applications installed in a master device and applications installed in a slave device when the master device is connected with the slave device;

obtaining package names of the applications installed in the slave device and package names of the applications installed in the master device, and determining whether the package names of the applications installed in the slave device and the package names of the applications installed in the master device have a same package name;

in a determination that the package names of the applications installed in the slave device and the package names of the applications installed in the master device have the same package name, using an application corresponding to the same package name as an application to be recommended;

obtaining usage information of the application to be recommended, and determining a priority of the application to be recommended according to the usage information; and displaying the application to be recommended on the master device or the slave device according to the priority.

2. The method of claim 1, wherein the step of obtaining usage information of the application to be recommended, and determining a priority of the application to be recommended according to the usage information comprises:

obtaining a running time of the application to be recommended in a preset time; and determining the priority of the application to be recommended according to the running time.

3. The method of claim 1, wherein the step of obtaining usage information of the application to be recommended, and determining a priority of the application to be recommended according to the usage information comprises:
obtaining a number of startups of the application to be recommended in a preset time; and
determining the priority of the application to be recommended according to the number of startups.

4. A method for displaying applications, comprising:
obtaining applications installed in a master device and applications installed in a slave device when the master device is connected with the slave device;
if the master device and the slave device have a same application, using the same application as an application to be recommended;
obtaining usage information of the application to be recommended, and determining a priority of the application to be recommended according to the usage information; and
displaying the application to be recommended on the master device or the slave device according to the priority.

5. The method of claim 4, wherein the step of obtaining usage information of the application to be recommended, and determining a priority of the application to be recommended according to the usage information comprises:
obtaining a running time of the application to be recommended in a preset time; and
determining the priority of the application to be recommended according to the running time.

6. The method of claim 5, wherein in the preset time, if a duration from startup to exit of the application to be recommended exceeds a first preset duration, then the duration from startup to exit is counted in the running time of the application to be recommended in the preset time.

7. The method of claim 4, wherein the step of obtaining usage information of the application to be recommended, and determining a priority of the application to be recommended according to the usage information comprises:
obtaining a number of startups of the application to be recommended in a preset time; and
determining the priority of the application to be recommended according to the number of startups.

8. The method of claim 7, wherein in the preset time, if a duration from startup to exit of the application to be recommended exceeds a second preset duration, then the number of the startups of the application to be recommended is counted once.

9. The method of claim 4, wherein the step of obtaining usage information of the application to be recommended, and determining a priority of the application to be recommended according to the usage information comprises:
obtaining a running time of the application to be recommended and a total time of the application to be recommended for receiving an operation instruction during the running time; and
determining the priority of the application to be recommended according to a ratio of the total time of the application to be recommended for receiving the operation instruction to the running time.

10. A system for displaying applications, comprising one or more processors and a non-transitory program storage medium storing program code executable by the one or more processors, the program code, when executed by the one or more processors, implements the following operations:
obtaining applications installed in a master device and applications installed in a slave device when the master device is connected with the slave device;
using a same application as an application to be recommended if the master device and the slave device have the same application;
obtaining usage information of the application to be recommended, and determining a priority of the application to be recommended according to the usage information; and
displaying the application to be recommended on the master device or the slave device according to the priority.

11. The system of claim 10, wherein the program code, when executed by the one or more processors, implements the following operations:
obtaining a running time of the application to be recommended in a preset time; and
determining the priority of the application to be recommended according to the running time.

12. The system of claim 11, wherein the program code, when executed by the one or more processors, implements the following operations: counting a duration from startup to exit in the running time of the application to be recommended in a preset time, if the duration from startup to exit of the application to be recommended exceeds a first preset duration.

13. The system of claim 10, wherein the program code, when executed by the one or more processors, implements the following operations:
obtaining a number of startups of the application to be recommended in a preset time; and
determining the priority of the application to be recommended according to the number of startups.

14. The system of claim 13, wherein the program code, when executed by the one or more processors, implements the following operations: counting the number of the startups of the application to be recommended as once, if a duration from startup to exit of the application to be recommended exceeds a second preset duration in the preset time.

15. The system of claim 10, wherein the program code, when executed by the one or more processors, implements the following operations: displaying other applications installed in the master device or the slave device after the application to be recommended.

* * * * *